United States Patent
Nolan et al.

(10) Patent No.: US 6,795,871 B2
(45) Date of Patent: Sep. 21, 2004

(54) APPLIANCE SENSOR AND MAN MACHINE INTERFACE BUS

(75) Inventors: Tam Nolan, Solana Beach, CA (US); Wolfgang Daum, Erie, PA (US); Rollie Richard Herzog, Louisville, KY (US); Mark Robert Mathews, Lombard, IL (US); Robert Marten Bultman, Smithfield, KY (US); John Steven Holmes, Sellersburg, IN (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/742,549

(22) Filed: Dec. 22, 2000

(65) Prior Publication Data

US 2003/0009610 A1 Jan. 9, 2003

(51) Int. Cl.[7] .......................... G06F 13/00; G06F 13/10
(52) U.S. Cl. ................... 710/8; 710/9; 710/11; 710/15; 710/16; 710/33
(58) Field of Search ................... 710/8, 9, 11, 15, 710/16, 33

(56) References Cited

U.S. PATENT DOCUMENTS

| | | | |
|---|---|---|---|
| 3,889,109 A | 6/1975 | Blessin | |
| 4,232,294 A | * 11/1980 | Burke et al. | 340/825.5 |
| 4,253,087 A | 2/1981 | Saal | |
| 4,387,578 A | 6/1983 | Paddock | |
| 4,490,986 A | 1/1985 | Paddock | |
| 4,495,497 A | 1/1985 | Molnar | |
| 4,535,598 A | 8/1985 | Mount | |
| 4,558,428 A | 12/1985 | Matsumura et al. | |
| 4,573,325 A | 3/1986 | Chiu et al. | |
| 4,626,846 A | 12/1986 | Parker et al. | |
| 4,701,910 A | 10/1987 | Ulug | |
| 4,780,813 A | * 10/1988 | Gerety et al. | 710/46 |
| 4,903,230 A | 2/1990 | Kaplan et al. | |
| 4,939,747 A | 7/1990 | Adler | |
| 5,128,962 A | 7/1992 | Kerslake et al. | |
| 5,140,306 A | 8/1992 | Hemphill, Sr. | |
| 5,210,531 A | 5/1993 | Fordham | |
| 5,247,522 A | 9/1993 | Reiff | |
| 5,315,597 A | * 5/1994 | Yang et al. | 714/712 |
| 5,398,251 A | 3/1995 | Shim | |

(List continued on next page.)

FOREIGN PATENT DOCUMENTS

JP        2000196682 A    *  7/2000    ........... H04L/25/40

*Primary Examiner*—Rehana Perveen
(74) *Attorney, Agent, or Firm*—H. Neil Houser, Esq.; Armstrong Teasdale LLP

(57) ABSTRACT

A control system for an appliance utilizing a plurality of peripheral devices includes a controller and a communications bus coupled to the plurality of peripheral devices and to the controller. The controller is configured to receive data from the peripheral devices over the communications bus and transmit control operations to the peripheral devices based on the data received. The communications bus reduces overall wiring requirements due to elimination or reduction of power wiring of the peripheral devices, facilitates distributed displays and human machine interfaces, and allows model differentiation with late point identification by a population of bus connections with a sensor, display, interface, or a blank. A data collision detection scheme is also provided to ensure proper communication along the bus.

29 Claims, 8 Drawing Sheets

U.S. PATENT DOCUMENTS

| | | |
|---|---|---|
| 5,450,072 A | 9/1995 | Vockenhuber |
| 5,454,230 A | 10/1995 | Janke et al. |
| 5,469,356 A * | 11/1995 | Hawkins et al. ............... 701/48 |
| 5,477,531 A | 12/1995 | McKee et al. |
| 5,485,470 A | 1/1996 | Yamada |
| 5,497,377 A | 3/1996 | Muto et al. |
| 5,557,741 A | 9/1996 | Jones |
| 5,576,698 A | 11/1996 | Card et al. |
| 5,586,123 A | 12/1996 | Baker |
| 5,613,158 A | 3/1997 | Savage |
| 5,640,401 A | 6/1997 | Yamada |
| 5,646,609 A | 7/1997 | O'Brien |
| 5,659,548 A | 8/1997 | Okamoto et al. |
| 5,664,221 A | 9/1997 | Amberg et al. |
| 5,680,113 A | 10/1997 | Allen et al. |
| 5,754,531 A | 5/1998 | Okamoto |
| 5,774,817 A | 6/1998 | Takagi et al. |
| 5,818,350 A | 10/1998 | Estakhri et al. |
| 5,826,093 A * | 10/1998 | Assouad et al. ............... 712/43 |
| 5,831,546 A | 11/1998 | Costa et al. |
| 6,067,628 A * | 5/2000 | Krithivas et al. ........... 713/340 |
| 6,272,402 B1 * | 8/2001 | Kelwaski ....................... 701/1 |

\* cited by examiner

TO FIG 3B

APPLIANCE SENSOR AND MAN MACHINE INTERFACE BUS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

This invention relates generally to control systems for appliances, and more particularly, to a control system for a refrigerator.

Known household appliances are available in various platforms having different structural features, operational features, and controls. For example, known refrigerator platforms include side-by-side single and double fresh food and freezer compartments, and vertically oriented fresh food and freezer compartments including top mounted freezer compartments, and bottom mounted freezer compartments. Conventionally, a different control system is used in each refrigerator platform. For example, a control system for a side-by-side refrigerator typically controls the freezer temperature by controlling operation of a mullion damper located between the fresh food compartment and the freezer compartment, a fresh food fan and a variable or multi-speed fan-speed evaporator fan. Top mount refrigerators and bottom mount refrigerators however, are available with and without a mullion damper, the absence or presence of which consequently affects the refrigerator controls. Other major appliances, including dishwashers, washing machines, dryers and ranges, are available in various platforms and employ different control schemes.

Known electronically controlled appliances typically employ a dedicated connection between a controller and a plurality of peripheral devices, including but not limited to sensors to monitor various operating conditions of the appliance. Typically, analog signals are transmitted between the sensors and the controller. These analog signals, however, are vulnerable to electrical interference, which can compromise performance of the appliance. To reduce electrical interference, additional electronic circuitry may be employed, but only at increased complexity and cost of the control scheme. Further, ever-expanding appliance features entail relatively sophisticated control schemes and many electrical connections to place all the peripheral devices in communication with the controller. A large number of electrical connections not only increases assembly costs, but presents a possible defect in manufacturing or possibility of failure in use.

BRIEF SUMMARY OF THE INVENTION

In an exemplary embodiment, a control system for an appliance utilizing a plurality of peripheral devices includes a controller and a communications bus coupled to the plurality of peripheral devices and to the controller. The controller is configured to receive data from the peripheral devices over the communications bus and transmit control operations to the peripheral devices based on the data received. The communications bus reduces overall wiring requirements due to elimination or reduction of power wiring of the peripheral devices, thereby increasing appliance reliability and safety performance. Distributed displays and human machine interfaces are also facilitated, and model differentiation is obtainable with late point identification by a population of bus connections with a sensor, display, interface, or a blank. Further, use of a digital low voltage bus system increases data reliability in the presence of electrical noise, thus improving electromagnetic compatibility of an appliance.

In one aspect, the communications bus is an asynchronous serial communications bus, and a data collision detection system prevents miscommunication between the controller and the peripheral devices. The controller includes a diagnostic communications port for requesting data available on the bus from the peripheral devices. The peripheral devices are each configured to be at least one of a master and a slave to send or receive a command packet over the bus to execute control functions. The peripheral devices include sensors, circuit boards, displays, or subsystems of the appliance, such as, for example, a refrigerator icemaker or dispensing system.

A flexible control scheme is therefore provided for reliable controlling various appliance platforms with a single control scheme.

DETAILED DESCRIPTION OF THE INVENTION

Figure 1:
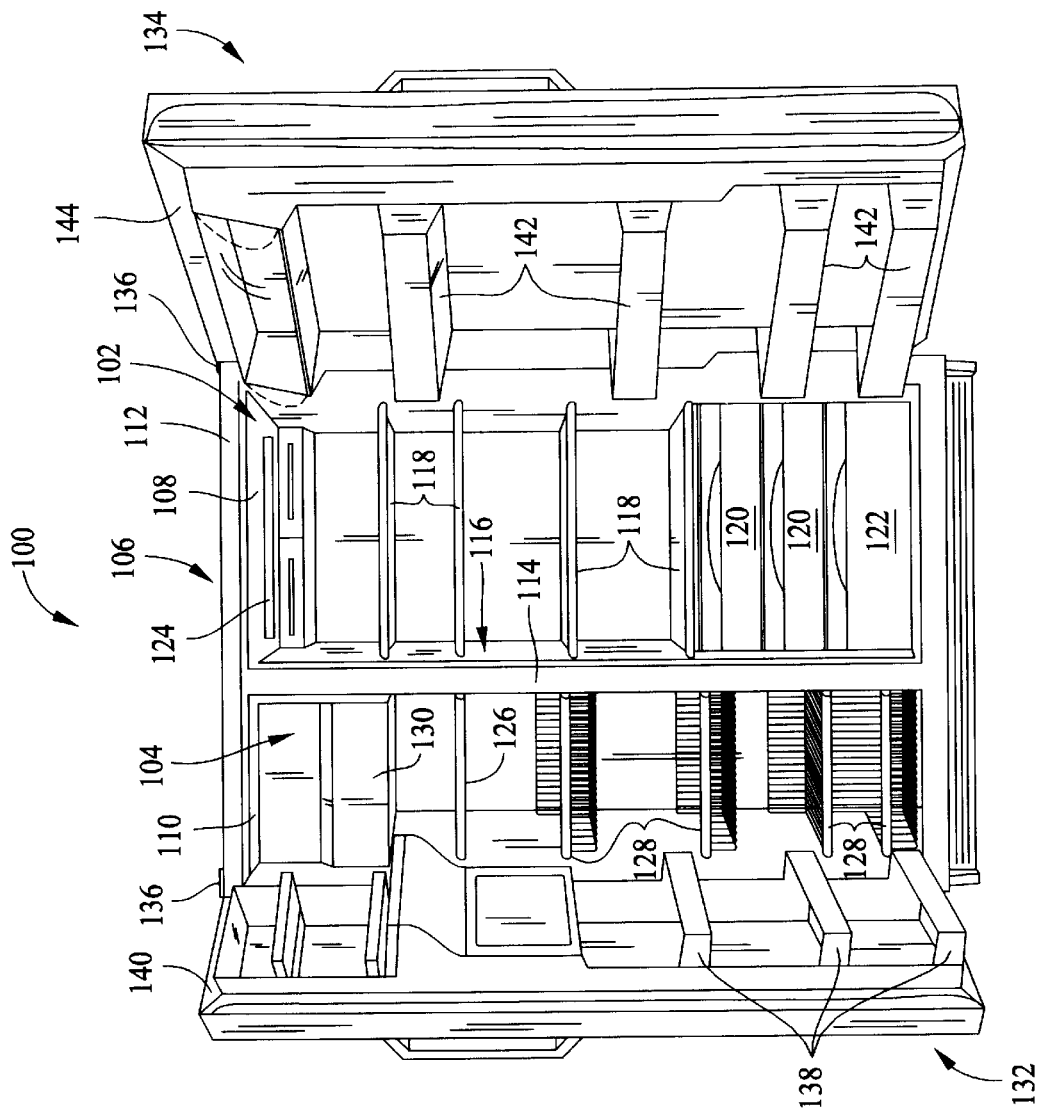
FIG. 1 is a perspective view of a refrigerator.

FIG. 1 illustrates a side-by-side refrigerator 100 in which the present invention may be practiced. It is recognized, however, that the benefits of the present invention apply to other types of appliances utilizing a plurality of peripheral devices communicating with an electronic controller. Consequently, the description set forth herein is for illustrative purposes only and is not intended to limit the invention to practice with a particular appliance, such as refrigerator 100.

Refrigerator 100 includes a fresh food storage compartment 102 and a freezer storage compartment 104. Freezer compartment 104 and fresh food compartment 102 are arranged side-by-side. A side-by-side refrigerator such as refrigerator 100 is commercially available from General Electric Company, Appliance Park, Louisville, Ky. 40225.

Refrigerator 100 includes an outer case 106 and inner liners 108 and 110. A space between case 106 and liners 108 and 110, and between liners 108 and 110, is filled with foamed-in-place insulation. Outer case 106 normally is formed by folding a sheet of a suitable material, such as pre-painted steel, into an inverted U-shape to form top and side walls of case. A bottom wall of case 106 normally is formed separately and attached to the case side walls and to a bottom frame that provides support for refrigerator 100. Inner liners 108 and 110 are molded from a suitable plastic material to form freezer compartment 104 and fresh food compartment 102, respectively. Alternatively, liners 108, 110 may be formed by bending and welding a sheet of a suitable metal, such as steel. The illustrative embodiment includes two separate liners 108, 110 as it is a relatively large capacity unit and separate liners add strength and are easier to maintain within manufacturing tolerances. In smaller refrigerators, a single liner is formed and a mullion spans between opposite sides of the liner to divide it into a freezer compartment and a fresh food compartment.

A breaker strip 112 extends between a case front flange and outer front edges of liners. Breaker strip 112 is formed from a suitable resilient material, such as an extruded acrylic-butadiene-styrene based material (commonly referred to as ABS).

The insulation in the space between liners 108, 110 is covered by another strip of suitable resilient material, which also commonly is referred to as a mullion 114. Mullion 114 also preferably is formed of an extruded ABS material. It will be understood that in a refrigerator with separate mullion dividing a unitary liner into a freezer and a fresh food compartment, a front face member of mullion corresponds to mullion 114. Breaker strip 112 and mullion 114 form a front face, and extend completely around inner peripheral edges of case 106 and vertically between liners 108, 110. Mullion 114, insulation between compartments, and a spaced wall of liners separating compartments, sometimes are collectively referred to herein as a center mullion wall 116.

Shelves 118 and slide-out drawers 120 normally are provided in fresh food compartment 102 to support items being stored therein. A bottom drawer or pan 122 partly forms a quick chill and thaw system (not shown) and selectively controlled, together with other refrigerator features, by a microprocessor (not shown in FIG. 1) according to user preference via manipulation of a control interface 124 mounted in an upper region of fresh food storage compartment 102 and coupled to the microprocessor. A shelf 126 and wire baskets 128 are also provided in freezer compartment 104. In addition, an ice maker 130 may be provided in freezer compartment 104.

A freezer door 132 and a fresh food door 134 close access openings to fresh food and freezer compartments 102, 104, respectively. Each door 132, 134 is mounted by a top hinge 136 and a bottom hinge (not shown) to rotate about its outer vertical edge between an open position, as shown in FIG. 1, and a closed position (not shown) closing the associated storage compartment. Freezer door 132 includes a plurality of storage shelves 138 and a sealing gasket 140, and fresh food door 134 also includes a plurality of storage shelves 142 and a sealing gasket 144.

In accordance with known refrigerators, refrigerator 100 also includes a machinery compartment (not shown) that at least partially contains components for executing a known vapor compression cycle for cooling air. The components include a compressor (not shown in FIG. 1), a condenser (not shown in FIG. 1), an expansion device (not shown in FIG. 1), and an evaporator (not shown in FIG. 1) connected in series and charged with a refrigerant. The evaporator is a type of heat exchanger which transfers heat from air passing over the evaporator to a refrigerant flowing through the evaporator, thereby causing the refrigerant to vaporize. The cooled air is used to refrigerate one or more refrigerator or freezer compartments via fans (not shown in FIG. 1). Collectively, the vapor compression cycle components in a refrigeration circuit, associated fans, and associated compartments are referred to herein as a sealed system. The construction of the sealed system is well known and therefore not described in detail herein, and the sealed system is operable to force cold air through the refrigerator in response to sensed conditions via a plurality of sensors (not shown in FIG. 1).

Figure 2:
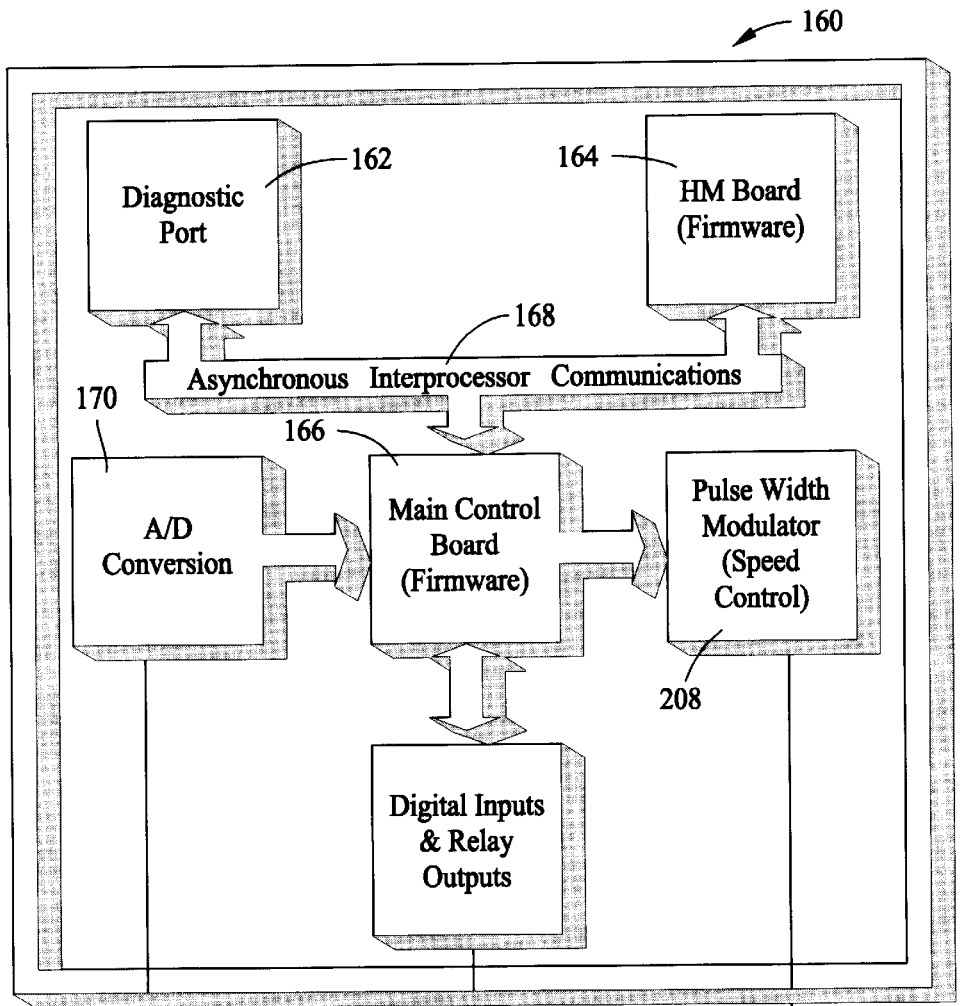
FIG. 2 is a block diagram of a refrigerator controller in accordance with one embodiment of the present invention.

FIG. 2 illustrates an exemplary controller 160 in accordance with one embodiment of the present invention. Controller 160 can be used, for example, in refrigerators, freezers and combinations thereof, including but not limited to refrigerator 100 (shown in FIG. 1). It is recognized, however, that controller 160 is easily adaptable to control other types of appliances, including but not limited to dishwashers, washing machines, dryers and ranges in light of the principles set forth below.

Controller 160 includes a diagnostic port 162 and a human machine interface (HMI) board 164 coupled to a main control board 166 by an asynchronous interprocessor communications bus 168. An analog to digital converter ("A/D converter") 170 is coupled to main control board 166. A/D converter 170 converts analog signals from a plurality of sensors including one or more fresh food compartment temperature sensors 172, a quick chill/thaw feature pan (i.e., pan 122 shown in FIG. 1) temperature sensors 174 (shown in FIG. 2), freezer temperature sensors 176, external temperature sensors (not shown in FIG. 2), and evaporator temperature sensors 178 into digital signals for processing by main control board 166.

In an alternative embodiment (not shown), A/D converter 170 digitizes other input functions (not shown), such as a power supply current and voltage, brownout detection, compressor cycle adjustment, analog time and delay inputs (both use based and sensor based) where the analog input is coupled to an auxiliary device (e.g., clock or finger pressure activated switch), analog pressure sensing of the compressor sealed system for diagnostics and power/energy optimization. Further input functions include external communication via IR detectors or sound detectors, HMI display dimming based on ambient light, adjustment of the refrigerator to react to food loading and changing the air flow/pressure accordingly to ensure food load cooling or heating as desired, and altitude adjustment to ensure even food load cooling and enhance pull-down rate of various altitudes by changing fan speed and varying air flow.

Digital input and relay outputs correspond to, but are not limited to, a condenser fan speed 180, an evaporator fan speed 182, a crusher solenoid 184, an auger motor 186, personality inputs 188, a water dispenser valve 190, encoders 192 for set points, a compressor control 194, a defrost heater 196, a door detector 198, a mullion damper 200, feature pan air handler dampers 202, 204, and a quick chill/thaw feature pan heater 206. Main control board 166 also is coupled to a pulse width modulator 208 for controlling the operating speed of a condenser fan 208, a fresh food compartment fan 210, an evaporator fan 212, and a quick chill system feature pan fan 214.

Figure 3A:
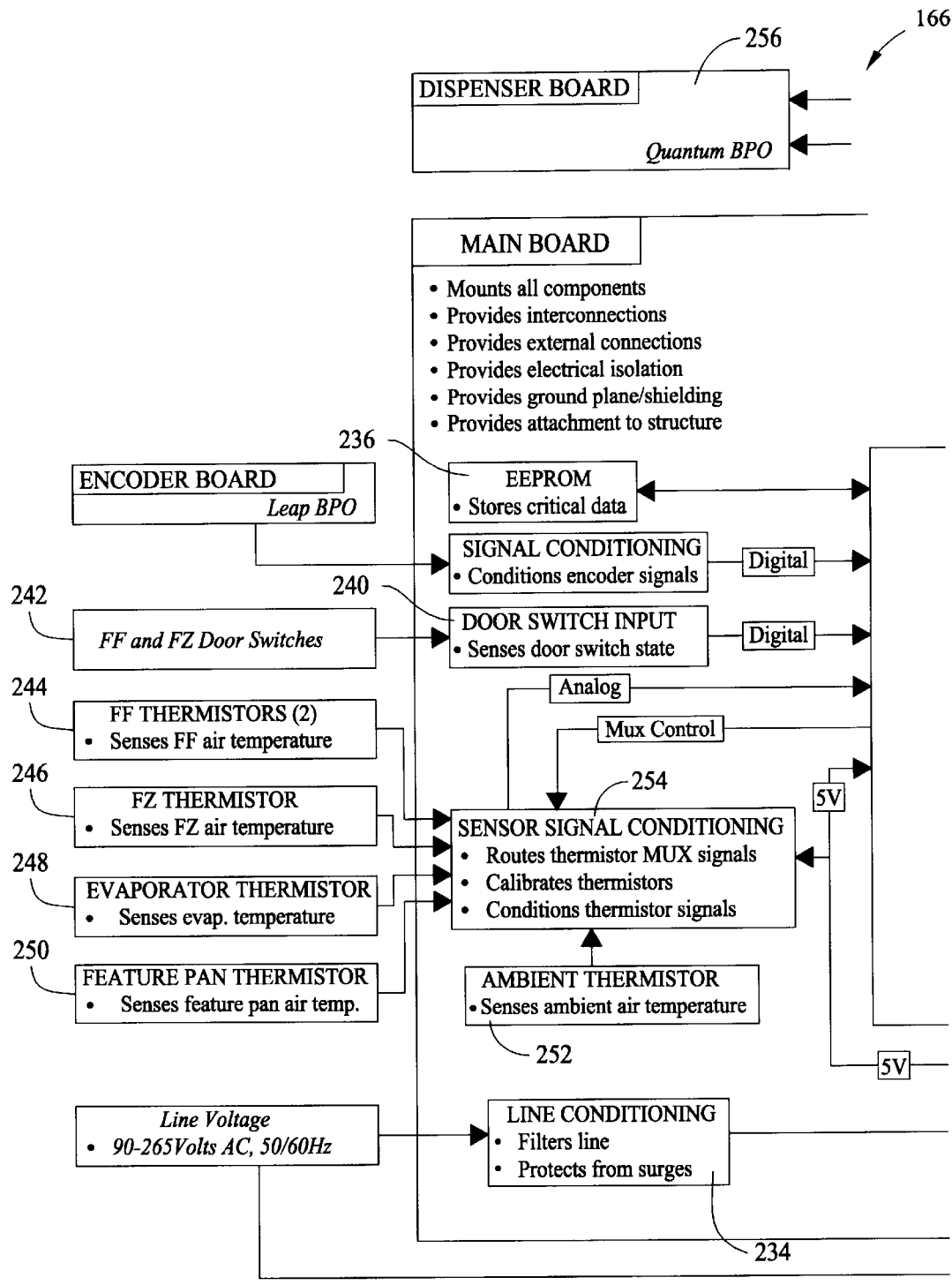
FIGS. 3A and 3B are a block diagram of the main control board shown in FIG. 2.
Figure 3B:
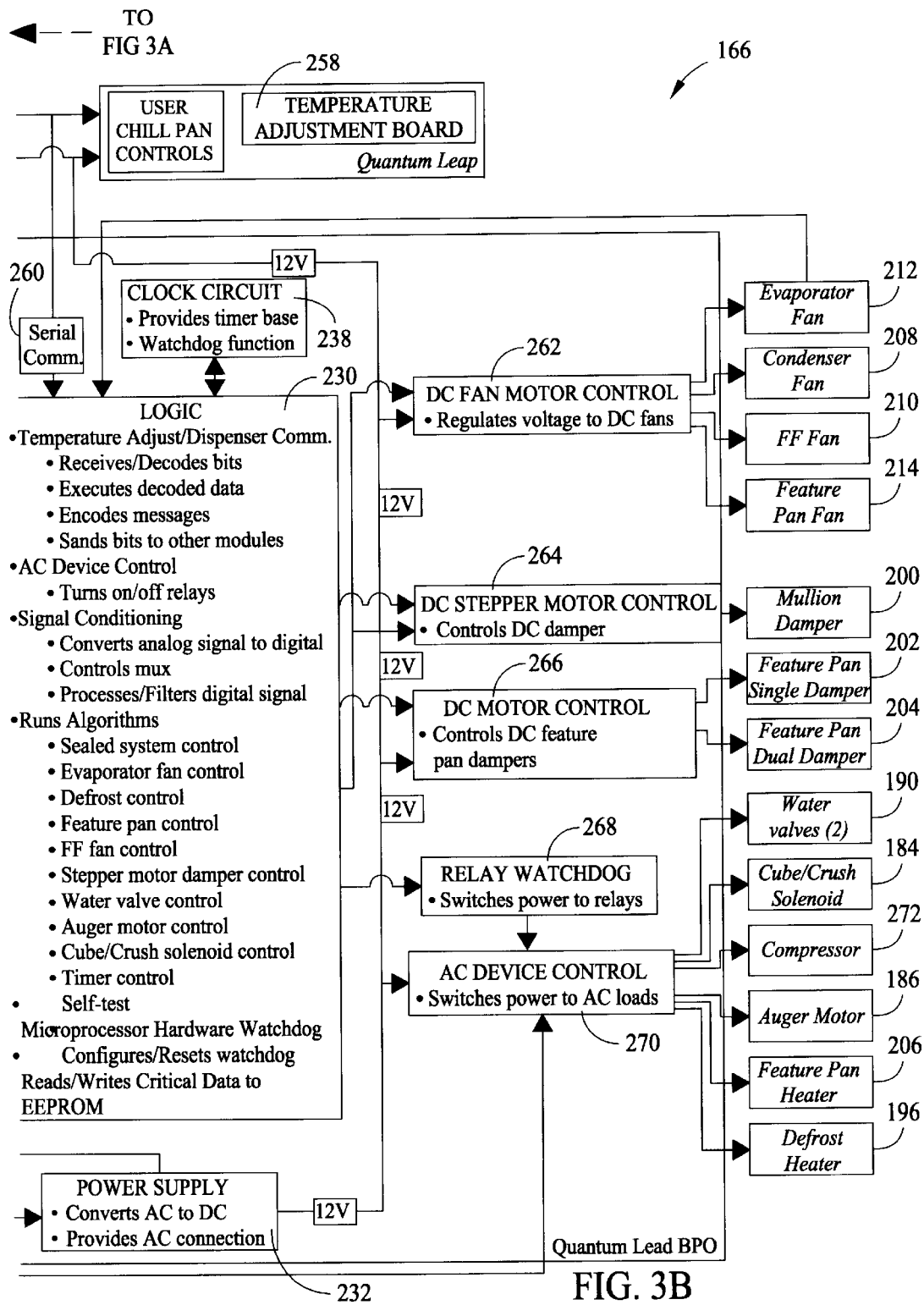
Figure 4:
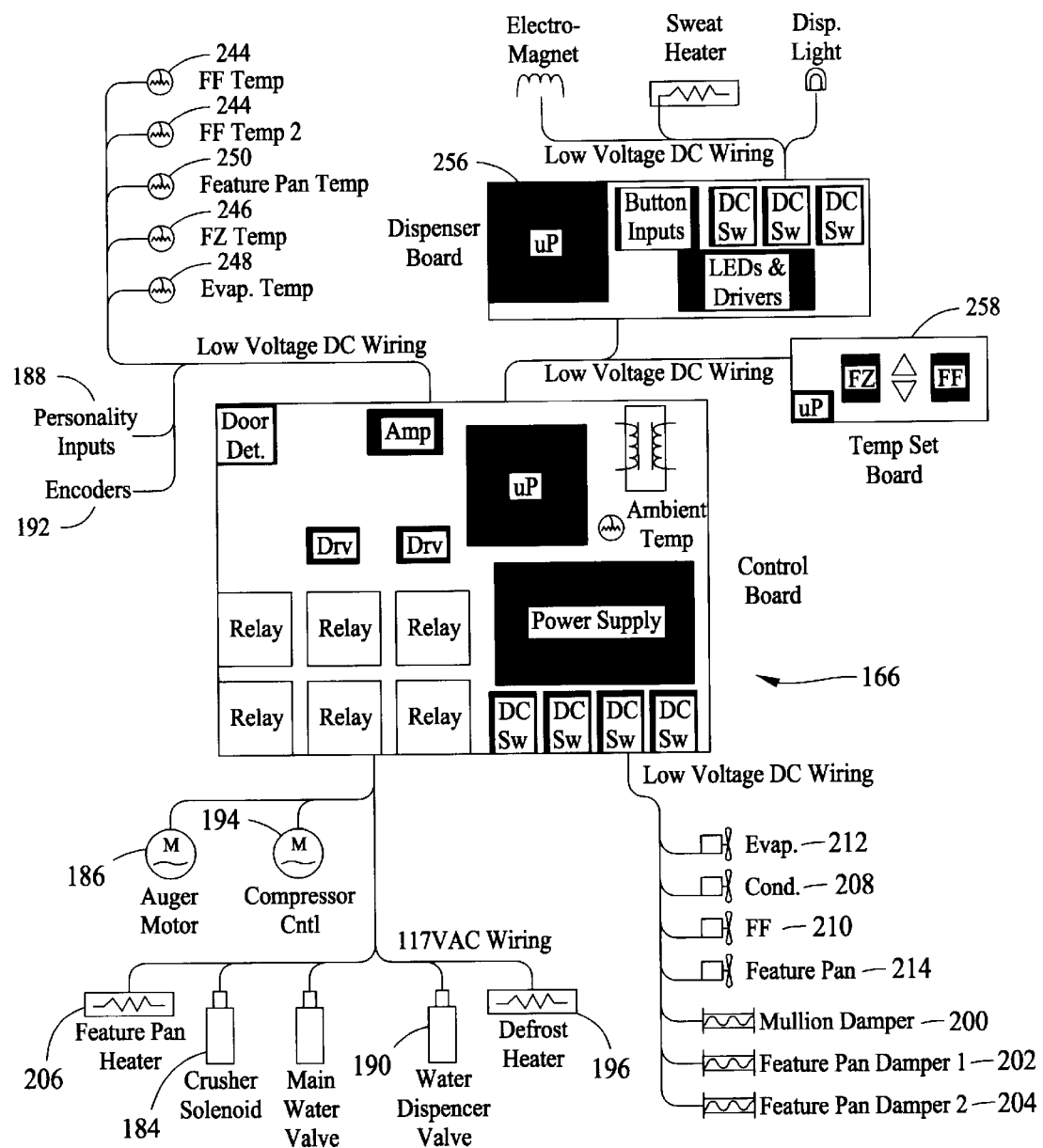
FIG. 4 is a block diagram of the main control board shown in FIG. 2.

FIGS. 3A, 3B and 4 are more detailed block diagrams of main control board 166. As shown in FIGS. 3A, 3B and 4, main control board 166 includes a processor 230. Processor 230 performs temperature adjustments/dispenser communication, AC device control, signal conditioning, microprocessor hardware watchdog, and EEPROM read/write functions. In addition, processor executes many control algorithms including sealed system control, evaporator fan control, defrost control, feature pan control, fresh food fan control, stepper motor damper control, water valve control, auger motor control, cube/crush solenoid control, timer control, and self-test operations.

Processor 230 is coupled to a power supply 232 which receives an AC power signal from a line conditioning unit 234. Line conditioning unit 234 filters a line voltage which is, for example, a 90–265 Volts AC, 50/60 Hz signal. Processor 230 also is coupled to an EEPROM 236 and a clock circuit 238.

A door switch input sensor 240 is coupled to fresh food and freezer door switches 242, and senses a door switch state. A signal is supplied from door switch input sensor 240 to processor 230, in digital form, indicative of the door switch state. Fresh food thermistors 244, a freezer thermistor 246, at least one evaporator thermistor 248, a feature pan thermistor 250, and an ambient thermistor 252 are coupled to processor 230 via a sensor signal conditioner 254. Conditioner 254 receives a multiplex control signal from processor 230 and provides analog signals to processor 230 representative of the respective sensed temperatures. Processor 230 also is coupled to a dispenser board 256 and a temperature adjustment board 258 via a serial communications link 260. Conditioner 254 also calibrates the above-described thermistors 244, 246, 248, 250, and 252.

Processor 230 provides control outputs to a DC fan motor control 262, a DC stepper motor control 264, a DC motor control 266, and a relay watchdog 268. Watchdog 268 is coupled to an AC device controller 270 that provides power to AC loads, such as to water valve 190, cube/crush solenoid 184, a compressor 272, auger motor 186, a feature pan heater 206, and defrost heater 196. DC fan motor control 266 is coupled to evaporator fan 212, condenser fan 208, fresh food fan 210, and feature pan fan 214. DC stepper motor control 266 is coupled to mullion damper 200, and DC motor control 266 is coupled to one of more sealed system dampers. The foregoing functions of the above-described electronic control system are performed under the control of firmware implemented as small independent state machines.

Figure 5:
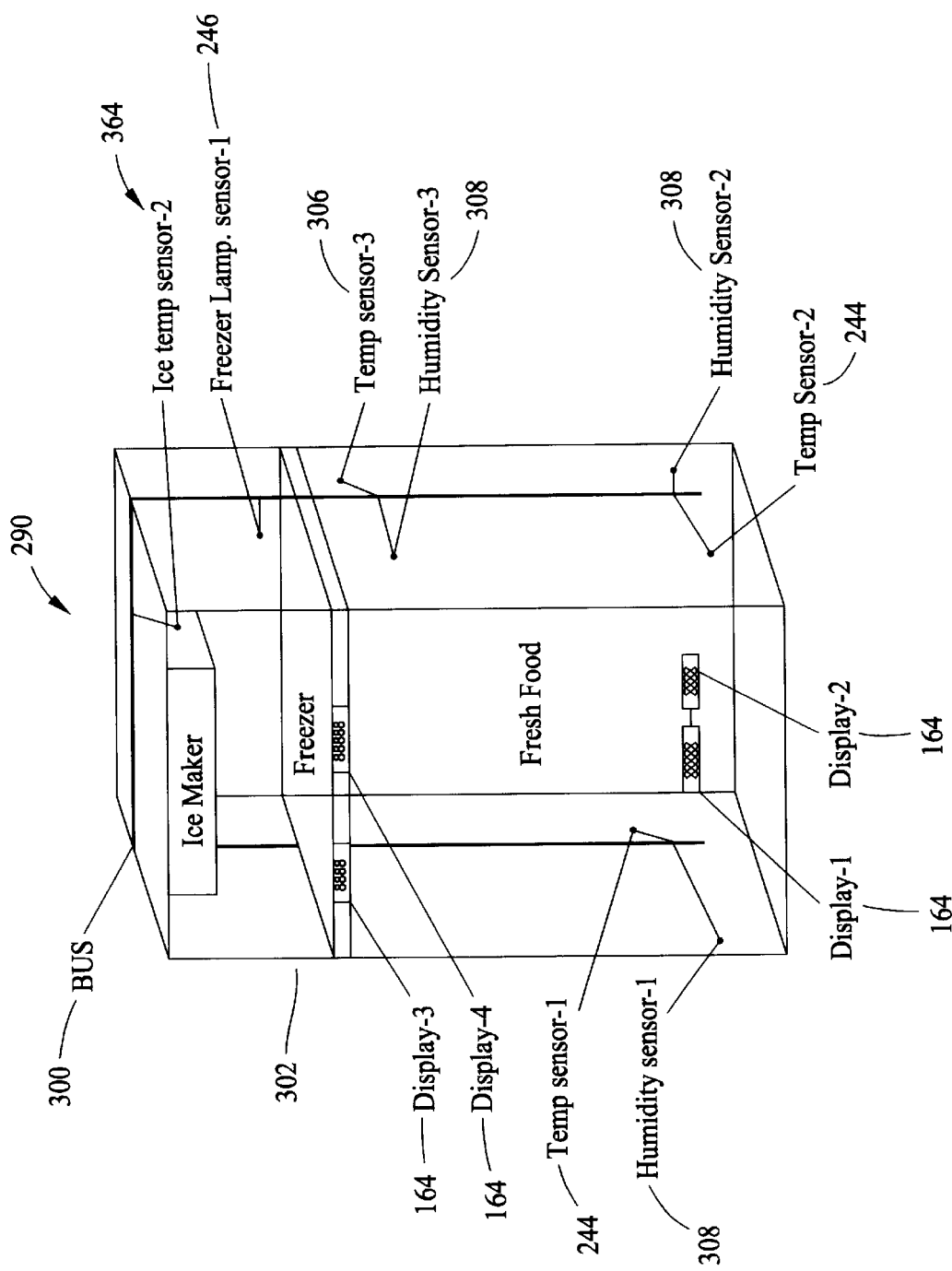
FIG. 5 illustrates exemplary bus and sensor connections in a top mount refrigerator.

FIG. 5 schematically illustrates a top mount refrigerator 290 including a common bus system 300 that connects an operator interface, such as human-machine interface 164 (shown in FIG. 2), peripheral devices, such as icemaker 130 (shown in FIG. 1), and sensors to controller 160 (shown in FIGS. 2–4). While bus system 300 is described and illustrated in the context of top mount refrigerator 290 for clarity, it is recognized that bus system 300 is but one example of intercommunications bus 168 (shown in FIGS. 3A and 3B) to control an appliance with a reduced numbers of electrical connections. Thus, the description set forth below is for illustrative purposes only rather than by way of limitation. The principles set forth herein are equally applicable to other types of appliances, including but not limited to refrigerators, ranges, dryers, washing machines and dishwasher appliances.

In a specific exemplary embodiment, a four wire serial bus 300 having two signal wires and two power/ground wires is molded into a refrigerator liner 302. Controller 160 is coupled to serial bus 300, thereby facilitating communication with sensors at all locations where sensory data is required as well as communication with a distributed human-machine interface system 164. Human-machine interface system 164 includes one or more visual displays (not shown), and one or more input selectors (not shown) for operator manipulation to enter refrigerator setpoints, activate refrigerator features, etc.

FIG. 5 illustrates exemplary locations known thermistor sensors including freezer temperature sensor 246, an icemaker temperature sensor 304; first and second fresh food temperature sensors 244, a third fresh food temperature 306, and fresh food humidity sensors-308. In alternative embodiments, greater or fewer than the illustrated number of sensors are employed and coupled to bus system 300 to allow controller 160 to make control decisions based upon operating conditions of refrigerator.

Common bus 300 connects sensors 244, 246, 304, and 308 and other peripheral devices to controller 160. Data exchange between these devices is accomplished by a digital serial signal such as via a one, two, or multi wire serial signal link. Each peripheral device has a unique digital address allowing controller 160 to query its status and request information. The addresses reduce a number of wires to be connected to bus 300. Given a predetermined set of possible responses from sensors 244, 246, 304, and 308 and different interfaces 164 per refrigerator platform, controller 160 is self configurable for different refrigerator platforms while detecting the proper operation of the entire system.

In operation, each sensor 244, 246, 304, and 308, and each peripheral device is selectable by controller 160 through its respective unique address. The address for sensors 244, 246, 304, and 308 is part of the connection scheme in distributed bus 300 where a multitude of additional binary address lines, common to all sensors, is terminated uniquely in a mold sensor connector (not shown in FIG. 5).

Figure 6:
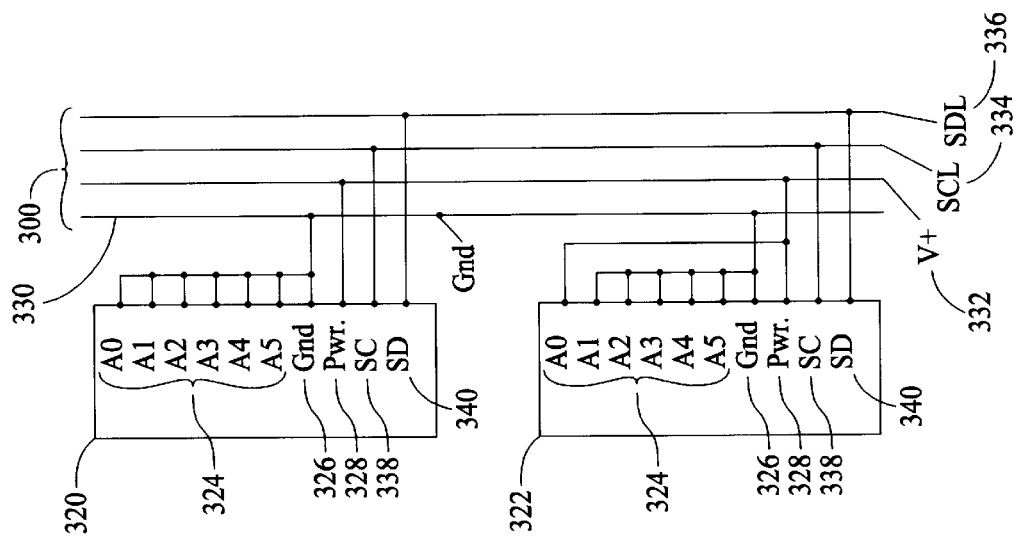
FIG. 6 is a schematic illustration of an addressing scheme.

FIG. 6 schematically illustrates exemplary address lines connected to a four line serial bus 300 using exemplary first and second mold sensor connectors 320 and 322. Each connector 320 and 322 includes six address lines 324 (labeled A0 through A5), a ground line 326, and a power line 328. Ground line 326 is connected ground line 330 of bus 300. Power line 328 is connected to power line 332 of bus 300. Address lines 324 of connector 320 are connected to ground 326. Address lines A1 through A5 of connector 322 are connected to ground 326. Address line A0 of connector 322 is connected to power line 332. Bus 300 includes signal lines 334, 336 through which control date is sent and received. Signal lines 334, 336 are coupled to signal lines 338, 340 of connectors 320, 322.

In one embodiment, a total of twenty-four unique addresses are required resulting in six address lines 324 per connector 320, 322. Thus, each connector 320, 322 has four wires that are connected between sensors 244, 246, 304, and 308 (shown in FIG. 5) and other devices, and six unique address lines 324 connected to power line 332 and ground 336. Bus 300 includes signal lines 334, 336 through which control date is sent and received. Signal lines 334, 336 are coupled to signal lines 348, 340 of connectors 320, 322, thereby providing twenty four distinct addresses (six per connector 320, 322 on signal line 334 and six per connector 320, 322 on signal line 336).

Figure 7:
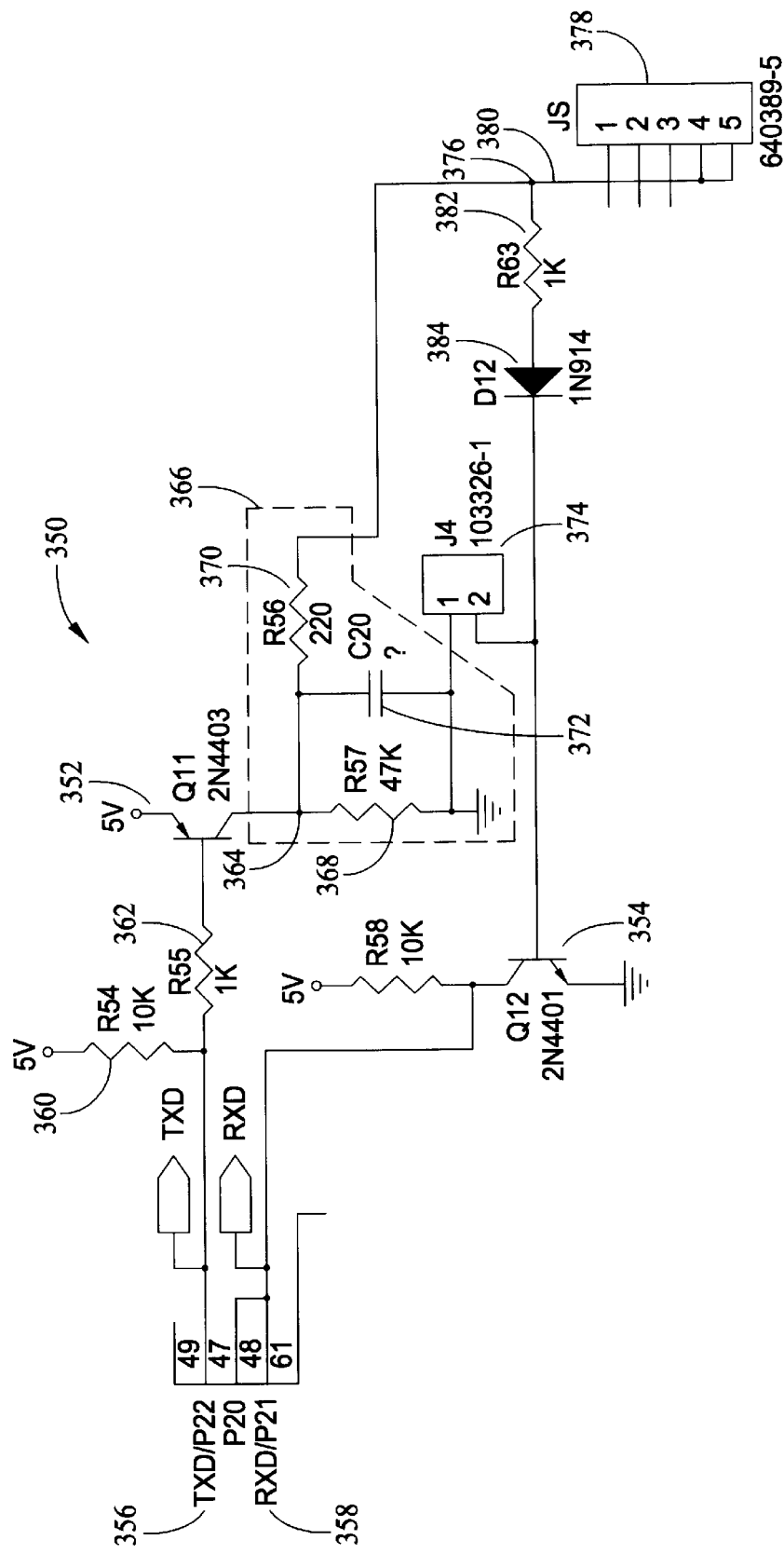
FIG. 7 is a circuit schematic of a one wire communication system.

In an alternative embodiment, a one-wire multi-drop bus 350 is employed, such as that schematically illustrated in FIG. 7. In bus 350, communications are asynchronous and any circuit board, e.g., controller board 166 (shown in FIG. 2), may be a "master" and any other circuit board, e.g., pulse width modulator 208 (shown in FIG. 2) may be a "slave" at any point in time. This topology allows a more object oriented system design approach where an event in the system allows the appropriate circuit board to communicate on bus 350 at the appropriate time.

Bus 350 includes a pair of transistors 352 and 354 connected in a loop back configuration, a transmit terminal 356 and a receive terminal 358. Transmit terminal 356 is connected to resistors 360 and 362 and transistor 352.

Transistor 352 is connected to node 364 and network 366. Network 366 includes resistors 368 and 370 and capacitor 372. Network 366 is connected to an input/output device 374 and node 376. Node 376 is coupled to connector 378 through one wire 380. Node 376 connects to resistor 382, which is connected in series to diode 384. Diode 384 is connected to input/output device 374 and to transistor 354. Transistor 354 is connected to receiver terminal 358.

The loop back configuration enables controller 160 (shown in FIGS. 2–4) to receive a copy of every byte it transmits. Since the transmitted and received signals are ground mixed, only one signal wire 380 is required to couple connector 378 to the bus. In a further alternative embodiment, a master unit (not shown) compares transmitted bytes to bytes that were received to ensure no data collision occurs. In still a further alternative embodiment, a signal line (not shown) is used to test the DC state of a communication line to ensure that the communication line is available for transmission.

More specifically, in one embodiment, a collision detection scheme is used to determine whether a device is holding a DC state of communication bus 350 to a non-quiescent state. Once a 'clear line' has been detected, a character is transmitted. Due to the loop-back of system 350, the receiver of the transmitting device receives a copy of the byte to be transmitted. The copy of the byte is compared to the byte actually sent to ensure that no data collision occurred. If a collision did occur then a re-try is executed.

In yet another alternative embodiment, an address is local to each sensor resulting in unique sensors addresses, thereby eliminating molded address line connectors and reducing the connector complexity. In this type of system, no two sensors may have the same address, and sensor personalization is added during sensor manufacture such as, for example, with unique sensor serial numbers on the same wafer and treating a wafer as a 'lot.' Controller 160 (shown in FIG. 2) then queries the sensors and peripheral devices for their address during fabrication or calibration, and controller 160 writes associated data into non-volatile memory 236 (shown in FIGS. 3A and 3B). In operation controller 160 uses this information to address the sensors in turn. This entails, however, a sufficient number of sensors available with different serial numbers for field service and upgrades.

In various alternative embodiments, a combination of the above described systems are employed for reduced cost or enhanced performance.

Appliance model differentiation can be achieved by either populating or not populating designated sensor locations communicating with one or more of the above-described buses 168, 300, 350. Additionally, model differences between displays, interfaces, and peripheral devices can be maintained by having different addresses assigned to different display, interface, and peripheral device types. Further, where multiple displays, interface, and peripheral devices are used, the sensor addressing scheme can be combined with model data being transmitted back to controller 160 to allow controller 160 to respond differently to different displays, interfaces, and peripheral devices. Still further, when a particular appliance model or platform does not call for a particular sensor to be present, a blank can be inserted to allow the same molded wiring approach to be used for all models. A versatile connection scheme is therefore provided.

If data bandwidth of the above schemes is determined to be insufficient, a dedicated serial or parallel bus connection scheme (not shown) may be used. Additionally, conventional analog signal response can be incorporated. The serial bus scheme described above can be expanded to a parallel bus scheme for higher data rate transmission by implementing, synchronously or asynchronously, combinations of the above-described schemes in parallel.

The above described digital bus connection scheme facilitates use of a modular controller/sensor/peripheral/human machine interface with commonality and upgrade paths. Additionally, overall wiring requirements are appreciably reduced due to elimination or reduction of power wiring resulting in increased appliance reliability and safety performance. Distributed displays and human machine interfaces are also facilitated, and model differentiation is obtainable with late point identification by a population of bus connections with a sensor, display, interface, or a blank.

Further, use of a digital low voltage bus system increases data reliability in the presence of electrical noise, thus improving electromagnetic compatibility of an appliance. Complexity of connectors and assembly is also reduced by through use of a bus system with common and interchangeable components. In certain cases, where very low signal levels only are available from the sensing device proper, local amplification and analog to digital signal conversion enables sensing of a required feature that previously was not possible with conventional analog signal processing.

Referring back to FIG. 2, a diagnostic communications port 162 (shown in FIG. 2) is provided to communicate with inter-processor serial communications bus 168 (shown in FIG. 2), or more specifically bus 350 in one embodiment (shown in FIG. 7). Therefore, diagnostics communications port 162 has a similar structure as bus 168 so that diagnostics port 162 can request any data that is available on the inter-processor serial communications bus 168.

Inter-processor serial communications bus 168 is used to communicate between two or more circuit boards, microcontrollers or other equipment (devices) distributed among one or more appliance platforms (typically between main control board 166 (shown in FIG. 2) and HMI board 164 (shown in FIG. 2)). Interprocessor serial communications bus 168 facilitates on demand communications in a multi-master environment. This communication standard does not imply, however, that more than two devices need be present to successfully communicate, nor does it limit a number of devices that can be placed on bus 168 beyond the limits set by the physical addressing scheme.

Because the system architecture has a level of asynchronous activity, the bus architecture is a multi-master environment. The multi-master arrangement allows any device in the system to request information or actions from any other device in the system at any time once they successfully attain control of bus 168 through arbitration.

In one embodiment, a collision detection scheme is employed to determine when communications port 162 is free or in use and when a collision has occurred on bus 168. A collision occurs when two or more masters attempt to use communications bus 168 at the same time. When bus 350 is used, a collision can be detected because the transmit and receive ports on controller 160 are connected to the same wire on bus 350, albeit through additional circuitry. Control of the interrupts associated with communications port 162 allows this to be an interrupt driven activity. Logically, this is a byte-oriented protocol. A higher level software protocol determines the length and content of packets comprising messages.

As will be seen, the protocol includes a physical layer, a data link layer, and an application layer. The physical layer determines an operational state of the bus system, the data link layer defines information communicated on the bus, and the application layer determines system response to communicated information on the bus. The following state table describes a physical layer of the protocol, explained further below.

Physical Communication Protocol State Table

| State | Action | Result | Next State |
|---|---|---|---|
| 1 | Are there bytes to send? | Yes | 2 |
|   |                          | No  | 1 |
| 2 | Check bus activity | Busy | 6 |
|   |                    | Free | 3 |
| 3 | Send Byte | | 4 |
| 4 | Does byte sent = byte received? | Yes | 1 |
|   |                                 | No  | 5 |
| 5 | Delay 3 to 8 byte times | Complete | 1 |
| 6 | Delay 5 byte times | Complete | 1 |

In delay states "5" and "6," a byte time is defined as the amount of time required to transmit a single byte on communications bus 168, which is dependent upon determined by the baud rate, number of data bits, number of stop bits, and a parity bit, if used.

The variable delay period shown in state "5" is intended to make the restart delay time random. If a collision does occur, the two bus masters will not delay the same amount of time before retrying transmission, thereby reducing the possibility of subsequent collisions by the two masters. The variable delay period is determined by a known pseudo-random number process, or by a known circuit board function.

The data-link layer defines information moving across bus 168 in any given information packet. The bytes defined in the data-link layer do not necessarily have a one-to-one correlation with the bytes in the physical layer. Many physical devices, such as inter-IC Control (I²C), have bits in the physical layer that implement the functions of some of the bytes in the data-link layer. This data-link layer is intended to be generic so that an application layer of the software will not need to change even if the physical device must be redesigned. This layer of the communication system is appropriate for such technologies as a Universal Asynchronous Receiver/Transmitter (UART) multi-drop environment.

The protocol is designed for use in a master/slave environment. However, rather than used with a designated master and several slaves, the protocol is implemented in a small network type of environment where a same device can be a master through one communication cycle and then become a slave for another communication cycle.

A command is used by a master device to request action from a slave. The command packet, in one embodiment, has the structure shown in the table below:

| STX | Address | Packet Length | Command | Data | CRC | ETX |
|---|---|---|---|---|---|---|
| 1 byte | 1 byte | 1 byte | 1 byte | N bytes | 2 bytes | 1 byte |

Specifically, Start-of-Text (STX) is one byte with a value of 0×02, and to determine whether an STX is valid, controller 160 determines whether an Acknowledge (ACK) byte follows STX. If the value 0×02 is in the middle of a transmission and not followed by ACK, the value should not be interpreted as an STX.

Address is one byte and each device connected to bus 168 has one effective address.

Packet length is the number of bytes in the packet including STX, Address, Packet Length, Command, Data, Cyclic-Redundancy Check (CRC), and End-of-Text (ETX). The packet length value is equivalent to 7+n, where n is the number of data bytes.

Command or request is one byte defined by the application layer.

Data may be zero, one, or multiple bytes as defined in the application layer, except for the case of a request in which the first data byte will be the master's address so the slave will know which device to respond to.

CRC is a 16-bit Cyclic-Redundancy Check, and ETX (End-of-Text) is one byte with a value of 0×03.

For each command packet sent, the CRC is computed on all bytes of the packet except the STX, the CRC byte pair and the ETX. An exemplary CRC source code is set for the in the Appendix. It is understood that the number of bytes may vary depending on specific need, that a different code may be used by the STX function, and that different ETX codes or CRC codes may be used in alternative embodiments.

An exemplary protocol is set forth Appendix Tables 1–3, and is shown with all ACKs in the sequence. At any point in the process where an ACK can be sent a Not-Acknowledge (NAK) may be sent instead. If a NAK is transmitted, the communication sequence is aborted at that point. The master then has the option of re-starting the sequence, depending on the application. A NAK is transmitted only in response to an overrun or framing error detected on, or in lieu of, a received byte or in response to a received ETX when the computed packet CRC does not match the transmitted packet CRC. An additional ACK is sent at the end of each packet.

In one embodiment, an ACK is one byte with a value of 0×06, and a NAK is one byte with a value of 0×15. In alternative embodiments, different codes are employed to identify an ACK and a NAK, respectively.

The protocol set forth in Appendix Tables 1–3 assume that time increments with each row of the table. Up to 100 milliseconds of delay is tolerated (and one embodiment, 100 milliseconds) for any expected event (row); an ACK response to a transmitted byte, or the reception of the next byte of an incomplete packet. Data direction is indicated by arrows. For the request sequence and response to request sequence, the first data byte is the transmitter's address.

Exemplary address designations are set forth in Appendix Table 4. A version number request and a version number reply are incorporated into the protocol application layer. Factory and service equipment can verify the version number and product type of each associated device for each appliance. A version number request command is shown below.

| Request Command | Value |
|---|---|
| Version Number Request | 0 × 01 |

The Version Number Request includes one data byte, which is the requestor's address. This enables the receiver to respond to the correct device.

A Version Number Reply includes four data bytes. The first data byte is the requestee's address. The requester then knows which device is replying. The second data byte is the product identifier (specified in the product application layer). The next two data bytes are the encoded version number. Appendix Table 5 sets forth an exemplary version number request and version number reply sequence. Printed wiring assembly in the product organizes the application layer.

Because main control board 166 controls most of the mission critical loads, each function within board 166 will include a time out. The time outs ensure that a failure in the communication system will not result in a catastrophic failure (e.g., when the water valve 190 (shown in FIG. 2) is actuated, a time out will prevent free flow of water through the valve if the communication system has been interrupted for a predetermined time). Appendix Table 6 sets forth exemplary main control board 166 commands for controlling various features of refrigerator 100 (shown in FIG. 1).

Appendix Table 7, sets forth bits in the byte returned by a sensor state command. A state of the refrigerator command returns the bytes as set forth in Appendix Table 8.

A command byte, command received, communication response, and physical response of HMI board 164 are set forth in Appendix Table 9. A set buttons command sends the bytes as specified in Appendix Table 10. The bits in the first two bytes correspond as shown in Appendix Table 10. Bytes 2–7 correspond to respective LEDs as shown in Appendix Table 10. A read buttons command returns the bytes specified in Appendix Table 11. The bits in the first two bytes correspond to the values set forth in Appendix Table 12.

A command byte, command received, communication response, and physical response of dispenser board 330 are set forth in Appendix Table 12. A set buttons commands send the bytes specified in Appendix Table 13. The bits in the first two bytes correspond as shown in Appendix Table 13. Bytes 2–7 correspond to the respective LEDs as shown in Appendix Table 13. The read buttons command returns the bytes shown in Appendix Table 14. The bits in the first two bytes correspond to the values set forth in Appendix Table 14.

Regarding HMI board 164 (shown in FIG. 2), parameter data is set forth in Appendix Table 15 and data stores is set forth in Appendix Table 16. For control board 166 (shown in FIGS. 2, 3A and 3B), parameter data is set forth in Appendix Table 17 and data stores is set forth in Appendix Table 18. Exemplary Read-Only Memory (ROM) constants are set forth in Appendix Table 19.

It is recognized that other bytes, codes, constants, addresses, and other parameter values may be used in alternative embodiments.

While the invention has been described in terms of various specific embodiments, those skilled in the art will recognize that the invention can be practiced with modification within the spirit and scope of the claims.

What is claimed is:

1. A method for controlling communications of an appliance system, the appliance including at least one peripheral device and a communications bus coupled to the peripheral device, said method comprising the steps of:
configuring each of the peripheral devices with a unique address;
configuring a first peripheral device as a master and a second peripheral device as a slave;
transmitting a command over the communications bus from the master to the slave, wherein transmitting a command comprises the step of transmitting a command packet including an STX, a slave address, a packet length, a command, a plurality of data bytes, a plurality of CRCs, and an ETX; and
receiving data from the slave.

2. A method in accordance with claim 1 wherein said step of transmitting a command further comprises the step of transmitting a protocol byte including at least one of a STX, an address, a packet length, a command, a data byte, a CRC byte, and an ETX.

3. A method in accordance with claim 2 wherein said step of transmitting a protocol byte comprises the step of validating with the protocol type.

4. A method in accordance with claim 2 wherein said step of validating a protocol byte comprises the step of verifying at least one of an ACK and a NAK following the protocol byte.

5. A method in accordance with claim 3 wherein said step of transmitting a command comprises the step of transmitting a protocol byte including at least an STX and an ACK, said step of transmitting the next protocol byte comprises the step of verifying that the ACK follows the STX.

6. A method in accordance with claim 3 wherein said step of transmitting a command comprises the step of transmitting a protocol byte including at least an STX and a NAK, said step of a transmitting the next protocol byte comprises the step of verifying the NAK follows the STX.

7. A method in accordance with claim 1 wherein said step of transmitting a command further comprises the step of transmitting a request sequence including an STX, a requestee address, a packet length, a request command, a requestor's address, a plurality of data bytes, a plurality of CRCs, and an ETX.

8. A method in accordance with claim 1 wherein said step of transmitting a command further comprises the step of transmitting a version number request sequence to include an STX, a requestee address, a packet length, a request command, a requestor's address, a plurality of CRCs, and an ETX.

9. A method in accordance with claim 1 wherein said step of transmitting a command further comprises the step of the slave responding to the master's request.

10. A method in accordance with claim 9 wherein the master requests information, said step of the slave responding to the master comprises the step of the slave transmitting an STX, a requestor's address, a packet length, a request command, a requestee's address, a plurality of data bytes, a plurality of CRCs, and an ETX.

11. A method in accordance with claim 10 wherein the master requests a version number, said step of the slave responding comprises the step of the slave transmitting a version number reply sequence including an STX, a requestor's address, a packet length, a request command, requestee's address, a product identifier, a plurality of version numbers, a plurality of CRCs, and an ETX.

12. A method in accordance with claim 1 wherein the communications bus comprises a plurality of peripheral devices configured as masters and a collision detection system, said step of transmitting a command comprises the step of arbitrating control of the communications bus using the collision detection system.

13. A method in accordance with claim 12 wherein said step of arbitrating control of the communications bus comprises the step of verifying there are bytes to transmit.

14. A method in accordance with claim 12 wherein said step of arbitrating control further comprises the step of checking for bus activity.

15. A method in accordance with claim 12 wherein said step of arbitrating control further comprises the step of authenticating a byte sent is identical to the byte received.

16. A method in accordance with claim 14 wherein said step of checking for bus activity comprises the step of delaying transmission of a byte.

17. A method in accordance with claim 13 wherein said step of authenticating a byte sent comprises the step of delaying transmission when the byte sent is not identical to the byte received.

18. A control system for an appliance including a plurality of peripheral devices, said control system comprising:
a controller;
a communications bus coupled to the plurality of peripheral devices and coupled to said controller, said communications bus including a diagnostic communications port and a collision detection system, said controller configured to:
receive data from the peripheral devices over said communications bus; and
transmit control operations to the peripheral devices based on said data,
wherein said plurality of peripheral devices are each configured to be at least one of a master and a slave, and
wherein said master is configured to send a command packet to request an action from a slave, and
wherein said command packet comprises an STX, an address, a packet length, a command, a data byte, a CRC, and an ETX.

19. A system in accordance with claim 18 wherein said communications bus comprises a serial communications bus.

20. A system in accordance with claim 19 wherein said serial communications bus comprises an asynchronous serial communications bus.

21. A system in accordance with claim 18 wherein said diagnostic communications port requests data available on said bus.

22. A system in accordance with claim 19 wherein said serial communications bus is configured as a four wire serial bus.

23. A system in accordance with claim 19 wherein said serial communications bus is configured as a one-wire multi-drop communications bus.

24. A system in accordance with claim 23 wherein said one-wire multi-drop communications bus comprises a pair of transistors electrically connected in a loop back configuration.

25. A system in accordance with claim 18 wherein said plurality of peripheral devices are each configured to be assigned a unique address.

26. A system in accordance with claim 18 wherein said plurality of peripheral devices comprises at least one sensor, a main controller board, and a human machine interface (HMI) board electrically connected to said communications bus.

27. A system in accordance with claim 18 wherein said plurality of peripheral devices comprises a plurality of sensors.

28. A system in accordance with claim 18 wherein said communications bus comprises a physical layer, a data-link layer, and an application layer.

29. A control system for an appliance including a plurality of peripheral devices, said control system comprising:
a controller;
a communications bus coupled to the plurality of peripheral devices and coupled to said controller, said communications bus including a diagnostic communications port and a collision detection system, said controller configured to:
receive data from the peripheral devices over said communications bus; and
transmit control operations to the peripheral devices based on said data,
each said peripheral device configured to send a request to and receive a response from another of said peripheral devices, each said request including a command packet comprising an STX, an address, a packet length, a command, a data byte, a CRC, and an ETX.

* * * * *

UNITED STATES PATENT AND TRADEMARK OFFICE
CERTIFICATE OF CORRECTION

PATENT NO. : 6,795,871 B2
DATED : September 21, 2004
INVENTOR(S) : Nolan et al.

It is certified that error appears in the above-identified patent and that said Letters Patent is hereby corrected as shown below:

Column 12,
Line 8, after "validating" delete -- with --.
Line 9, delete "2" and insert -- 3 --.

Signed and Sealed this

Twenty-first Day of February, 2006

JON W. DUDAS
*Director of the United States Patent and Trademark Office*